L. E. NEBERGALL.
SLIP SOCKET.
APPLICATION FILED OCT. 24, 1910.
988,489.
Patented Apr. 4, 1911.
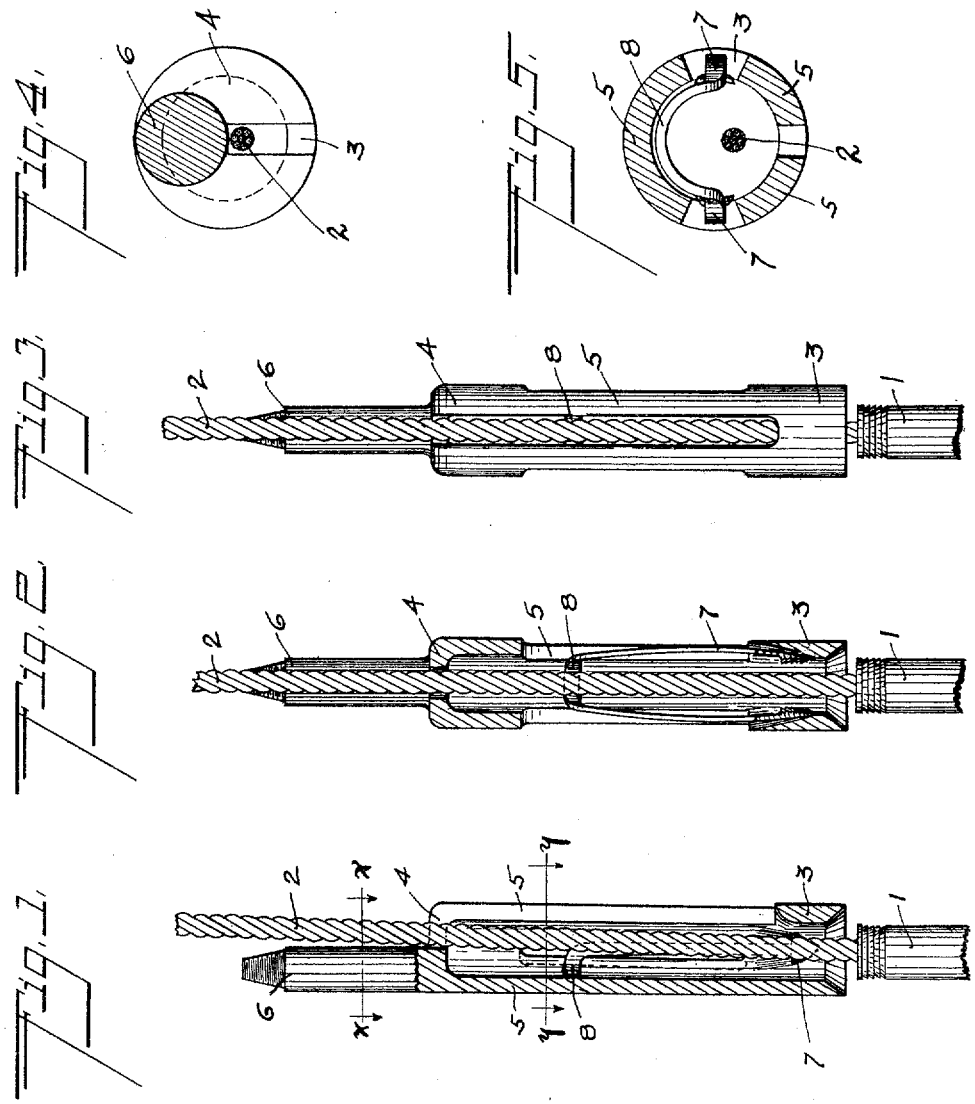
Loran E. Nebergall, Inventor.
Witnesses:
Roy G. Kratz
Lucy L. Sawyer
By David O. Barnell,
Attorney.

UNITED STATES PATENT OFFICE.

LORAN E. NEBERGALL, OF OMAHA, NEBRASKA.

SLIP-SOCKET.

988,489.  Specification of Letters Patent.  Patented Apr. 4, 1911.

Application filed October 24, 1910.  Serial No. 588,876.

*To all whom it may concern:*

Be it known that I, LORAN E. NEBERGALL, a citizen of the United States, and a resident of Omaha, in the county of Douglas and State of Nebraska, have invented certain new and useful Improvements in Slip-Sockets, of which the following is a specification.

My invention relates to deep-well boring and more particularly to devices for use in recovering tools which during the boring of the well may become stuck therein through the caving of material on top of them, or from other causes.

It is the object of my invention to provide a device for use in "fishing" for such tools, which may be worked over the drill-rope to loosen the cavings without chafing or wearing the rope, which may be guided to the tools by the drill-rope, and which may be engaged with the rope-socket without first cutting off the drill-rope which is attached thereto.

In the boring of deep wells for water, oil and the like, the loosening of the material at the bottom of the hole is effected by alternately raising and dropping the drill which is the lowermost member of a "string" of tools having at the upper end thereof a rope-socket to which is connected the drill-rope which extends up to the hoisting machinery. The drilling tools are from time to time withdrawn from the hole and the loosened material removed from the hole by means of a bucket or bailer. During the drilling operation any material which may cave in from the sides of the hole may wedge the tools therein so that they cannot be withdrawn by pulling up on the drill-rope. Under such conditions it is necessary to lower into the hole a string of fishing tools which comprise a device capable of engaging or gripping the rope-socket, and other devices connected with the gripping device and adapted for working the drilling tools upwardly in the hole. The lower member of the string of fishing tools is known in the art as a "slip-socket" and the gripping device carried inside the slip-socket which takes hold of the rope-socket is known as a "slip."

My invention relates specifically to the construction of the slip and the slip-socket.

A device embodying my invention is illustrated in the accompanying drawings, in which—

Figure 1 is a vertical section in the plane of the offset of the shank or pin of the socket, Fig. 2 is a vertical section in a plane at right angles to the plane of section of Fig. 1, Fig. 3 is an elevation of the socket from the side having the slotted wing, Fig. 4 is a horizontal section on the line $x$—$x$ of Fig. 1, and Fig. 5 is a horizontal section on the line $y$—$y$ of Fig. 1.

In the drawings there is shown the upper part of the rope-socket 1 which forms the upper member of the string of drilling tools and to which is connected the drill-rope 2. My slip-socket when in use is passed down over the drill-rope, which is threaded through the socket before it is lowered into the hole, and the drill-rope is held taut during the fishing operations. The lower portion or bowl 3 of the slip-socket has a flared opening at the bottom thereof to assist in guiding the rope-socket into it, and within the upper part of the bowl are provided inclined seats to receive the jaws of the slip. The bowl is connected with the upper portion or head 4 by the wings 5, and the shank or pin 6 is extended up from one side of the head above one of the wings, being offset sufficiently to bring one side thereof in line with the outside of the wing. In the wing at the opposite side of the socket is a vertical slot which extends from the bowl up to the head and enters the head as far as the side of the pin 6. The width of the slot is slightly greater than the diameter of the drill-rope. The slip comprises a pair of serrated jaws having the outer sides thereof shaped so as to enter the seats therefor in the bowl of the socket, the jaws being carried like tongs at the lower ends of arms 7 which are integral with and connected to each other at their upper ends by the laterally curved bar 8. By the lateral curvature of the bar 8 of the slip, and the formation of the slot in the wing and head of the socket, the drill-rope 2 may pass directly up through the slip and socket so that the same may be worked over the rope without wearing or chafing the same.

In the use of the fishing devices for recovering tools which have been caught and held in the hole through the caving-in of material above them, my slip-socket may be run down over the drill-rope without using the slip therein and worked down through the cavings until the rope-socket is reached. Where a large amount of material is above the drilling tools it may be necessary to occasionally withdraw the slip-socket from the hole and run down a bucket in order to bail out the material which has been worked loose by the socket. After the slip-socket has been worked down to the rope-socket so as to pass over the same, the slip-socket is withdrawn from the hole and the slip placed in position therein. "Jars", or other suitable tools for working loose the drilling tools after they are engaged by the slip, are connected with the pin 6 of the slip-socket and the string of fishing tools is then lowered in the shaft until the rope-socket is engaged by the slip, after which the recovery of the drilling tools proceeds in the usual manner.

It will be seen that by the use of the drill-rope to guide the slip-socket down over the rope-socket, the latter may be engaged and the drilling tools recovered even where through excessive caving the tools have got out of the vertical line of the hole so that they could not be reached by ordinary fishing devices which necessitate the drill-rope being cut off as the first of the fishing operations. For recovering tools not connected with a line my slip-socket may be used in the same manner as the ordinary slip-socket would be under similar conditions.

Now, having described my invention, what I claim and desire to secure by Letters Patent is:

1. In a device of the class described, the combination with a slip having an upper connecting portion displaced laterally from the plane of the jaws, of a slip-socket having an unobstructed vertical passage through the same for the purpose set forth.

2. In a device of the class described, the combination with a slip having an upper connecting portion displaced laterally from the plane of the jaws, of a slip-socket having an offset pin and a slot in the body of the socket disposed so as to complete a substantially vertical unobstructed central passage through the slip and socket, for the purpose set forth.

3. In a device of the class described, a slip having a laterally curved upper portion, and a slip-socket comprising a bowl formed to receive the jaws of the slip, a head, wings connecting the bowl and head, and a pin connected with the head over one of the wings, the other wing being slotted vertically and the slot extending into the head so that an unobstructed vertical passage is formed through the socket and slip.

In testimony whereof I have hereunto subscribed my name in the presence of two witnesses.

L. E. NEBERGALL.

Witnesses:
Roy G. Kratz,
David O. Barnell.

---

Copies of this patent may be obtained for five cents each, by addressing the "Commissioner of Patents, Washington, D. C."